United States Patent
Jung et al.

(10) Patent No.: US 10,962,821 B2
(45) Date of Patent: Mar. 30, 2021

(54) DISPLAY DEVICE AND METHOD FOR MANUFACTURING THE SAME

(71) Applicant: Samsung Display Co., Ltd., Yongin-si (KR)

(72) Inventors: Jin Soo Jung, Yongin-si (KR); Young Gu Kim, Yongin-si (KR); Taek Joon Lee, Yongin-si (KR); Hye Lim Jang, Yongin-si (KR); Baek Kyun Jeon, Yongin-si (KR)

(73) Assignee: Samsung Display Co., Ltd.

( * ) Notice: Subject to any disclaimer, the term of this patent is extended or adjusted under 35 U.S.C. 154(b) by 240 days.

(21) Appl. No.: 15/804,633

(22) Filed: Nov. 6, 2017

(65) Prior Publication Data

US 2018/0203291 A1     Jul. 19, 2018

(30) Foreign Application Priority Data

Jan. 19, 2017  (KR) .................. 10-2017-0009231

(51) Int. Cl.
    *G02F 1/1335*   (2006.01)
    *G02F 1/13357*  (2006.01)
    (Continued)

(52) U.S. Cl.
    CPC ..... *G02F 1/133514* (2013.01); *C08G 59/245* (2013.01); *C08G 59/38* (2013.01);
    (Continued)

(58) Field of Classification Search
    CPC . C08G 59/245; C08G 59/38; G02F 1/133514; G02F 1/133528; G02F 1/133617; G02F 2001/133519; G02F 2001/133548; G02F 2203/055; Y10T 428/1041; C09D 163/00
    See application file for complete search history.

(56) References Cited

U.S. PATENT DOCUMENTS

| 7,750,984 | B2 | 7/2010 | Ha et al. |
| 2014/0078716 | A1* | 3/2014 | Ninan ............... G02F 1/133617 362/84 |
| 2017/0261806 | A1* | 9/2017 | Niu ....................... G02B 5/3058 |

FOREIGN PATENT DOCUMENTS

| CN | 105182594 A | * 12/2015 |
| CN | 105182594 A |   12/2015 |

(Continued)

OTHER PUBLICATIONS

Extended European Search Report, Application No. 18151482.9, dated Jun. 8, 2018, 10 pages.

(Continued)

*Primary Examiner* — Sophie Hon
(74) *Attorney, Agent, or Firm* — Innovation Counsel LLP

(57) ABSTRACT

A display device includes a first base substrate; a liquid crystal layer disposed on the first base substrate; an overcoat layer disposed on the liquid crystal layer and including epoxy polymer; a color conversion layer disposed on the overcoat layer; and a second base substrate disposed on the color conversion layer. The epoxy polymer is a polymer obtained by polymerizing 1 part to 50 parts by weight of a cardo-based binder resin; 1 part to 50 parts by weight of an epoxy-based monomer; and 1 part to 50 parts by weight of a bisphenol-based resin, with respect to 100 parts by weight.

17 Claims, 11 Drawing Sheets

(51) Int. Cl.
*C08G 59/38* (2006.01)
*C08G 59/24* (2006.01)

(52) U.S. Cl.
CPC .. *G02F 1/133516* (2013.01); *G02F 1/133617* (2013.01); *C09K 2323/031* (2020.08); *C09K 2323/055* (2020.08); *G02F 2001/133519* (2013.01); *G02F 2001/133548* (2013.01); *G02F 2203/055* (2013.01)

(56) References Cited

FOREIGN PATENT DOCUMENTS

| | | | | |
|---|---|---|---|---|
| JP | 3909349 B2 * | 4/2007 | ............. | C08G 59/24 |
| KR | 10-0550938 B1 | 2/2006 | | |
| KR | 10-2014-0102613 A | 8/2014 | | |
| KR | 10-2015-0080135 A | 7/2015 | | |
| WO | 96/34303 A1 | 10/1996 | | |

OTHER PUBLICATIONS

K. Sasaki, S. Kazama, Y. Miyagawa, Y. Uchimiya and K. Fujishiro, T. "Teramoto, Novel Topcoat Planarization Derived From Cardo Epoxy", IDW '99, Jan. 1, 1999, pp. 419-422., Nippon Steel Chemical Co., Ltd., Chiba 292-0835, Japan, Tokyo 141-0031 , Japan.

* cited by examiner

DISPLAY DEVICE AND METHOD FOR MANUFACTURING THE SAME

CROSS-REFERENCE TO RELATED APPLICATION

This application claims priority to and the benefit of Korean Patent Application No. 10-2017-0009231, filed in the Korean Intellectual Property Office on Jan. 19, 2017, the entire contents of which are incorporated herein by reference.

BACKGROUND

1. Field

The present inventive concept relates to a display device and a method for manufacturing the same, more particularly a liquid crystal display and a method for manufacturing the same.

2. Description of the Related Art

Various display devices capable of displaying information are being developed. A display device includes a liquid crystal display (LCD), a plasma display panel (PDP), an electrophoretic display, and an organic light emitting diode (OLED) display, and the like.

In particular, the liquid crystal display displays an image by using optical anisotropy and birefringence characteristics of liquid crystal molecules. When an electric field is applied to the liquid crystal molecules, an arrangement of the liquid crystal molecules is changed, and a transmittance of light according to the changed arrangement direction of liquid crystal molecules may be changed.

Meanwhile, a liquid crystal display includes a color filter layer for representing a color, and the color filter layer may include a quantum dot to improve a light efficiency. Since the quantum dot has high color purity and color reproducibility, the liquid crystal display may provide a high quality color.

SUMMARY

An exemplary embodiment of the present inventive concept provides a display device with improved display quality and a method for manufacturing the same.

A display device according to an exemplary embodiment of the present inventive concept includes a first base substrate; a liquid crystal layer disposed on the first base substrate; an overcoat layer disposed on the liquid crystal layer and including epoxy polymer; a color conversion layer disposed on the overcoat layer; and a second base substrate disposed on the color conversion layer.

The epoxy polymer is a polymer obtained by polymerizing 1 part to 50 parts by weight of a cardo-based binder resin, 1 part to 50 parts by weight of an epoxy-based monomer, and 1 part to 50 parts by weight of a bisphenol-based resin, with respect to 100 parts by weight.

In an exemplary embodiment of the present inventive concept, the epoxy polymer may contain 20 parts to 40 parts by weight of the cardo-based binder resin with respect to 100 parts by weight.

In an exemplary embodiment of the present inventive concept, the cardo-based binder resin may include compounds represented by Chemical Formula 1.

[Chemical Formula 1]

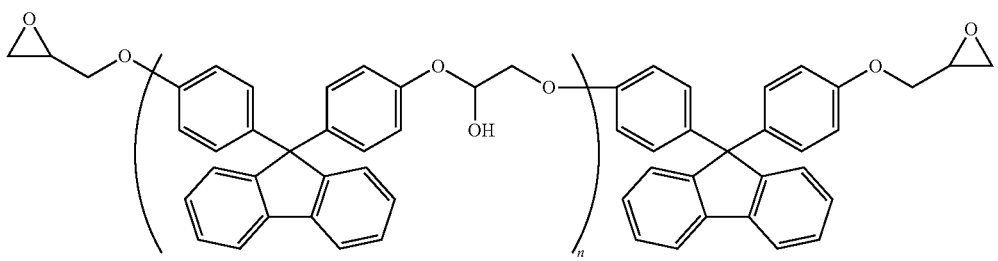

wherein, n is a natural number in which the cardo-based binder resin has a molecular weight of 5,000 to 20,000.

In an exemplary embodiment of the present inventive concept, the epoxy polymer may contain 10 parts to 30 parts by weight of the epoxy-based monomer with respect to 100 parts by weight.

The epoxy-based monomer may include at least one of compounds represented by Chemical Formula 2.

[Chemical Formula 2]

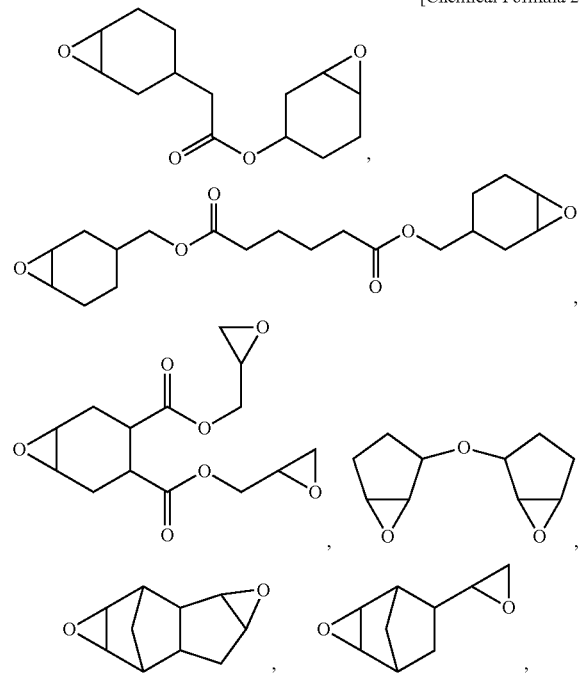

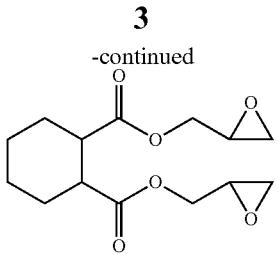

In an exemplary embodiment of the present inventive concept, the bisphenol-based resin may be a bisphenol A-based resin, and the epoxy polymer may contain 15 parts to 25 parts by weight of the bisphenol A-based resin with respect to 100 parts by weight.

In an exemplary embodiment of the present inventive concept, the epoxy polymer further includes 20 parts to 30 parts by weight of at least one of a bisphenol F-based resin, a novolac resin, and an aliphatic epoxy resin with respect to 100 parts by weight.

In an exemplary embodiment of the present inventive concept, the overcoat layer may further include 60 parts to 120 parts by weight of a curing agent, with respect to 100 parts by weight of the epoxy polymer.

In an exemplary embodiment of the present inventive concept, the display device may further include a polarization layer disposed between the liquid crystal layer and the overcoat layer.

The polarization layer may be a wire grid polarizer.

In an exemplary embodiment of the present inventive concept, the display device may further include a light source spaced apart from the first base substrate and providing first light to the liquid crystal layer.

In an exemplary embodiment of the present inventive concept, the color conversion layer may include first to third color filters representing different colors from each other.

The second color filter may include a first light conversion material converting the first light into a second light which represents a different color from the first light, and the third color filter includes a second light conversion material converting the first light into a third light which represents a different color from the first light and the second light.

In an exemplary embodiment of the present inventive concept, each of the first light conversion material and the second light conversion material may be a quantum dot.

In an exemplary embodiment of the present inventive concept, the first to third lights may be respectively blue light, green light, and red light.

In an exemplary embodiment of the present inventive concept, the display device may further include a first light filter layer disposed between the second base substrate and the second color filter and between the second base substrate and the third color filter so as to block the first light.

In an exemplary embodiment of the present inventive concept, the display device may further include a second light filter layer disposed between the color conversion layer and the overcoat layer so as to transmit the first light and reflect the second light and the third light.

Method for manufacturing a display device according to an exemplary embodiment of the present inventive concept include forming a first electrode and a liquid crystal layer on a first base substrate, forming a color conversion layer on a second base substrate, forming an overcoat layer on the color conversion layer, forming a second electrode on the overcoat layer, and disposing the first base substrate and the second base substrate so that the liquid crystal layer is disposed between the first electrode and the second electrode.

The forming the overcoat layer includes forming an epoxy composition including 1 part to 50 parts by weight of a cardo-based binder resin, 1 part to 50 parts by weight of an epoxy-based monomer, and 1 part to 50 parts by weight of a bisphenol-based resin with respect to 100 parts by weight on the color conversion layer, and curing the epoxy composition.

In an exemplary embodiment of the present inventive concept, the method for manufacturing the display device may further include forming a polarization layer between the overcoat layer and the second electrode.

According to an exemplary embodiment of the present inventive concept, a display device with improved display quality and a method for manufacturing the same are provided.

DETAILED DESCRIPTION OF THE EMBODIMENTS

Figure 1:
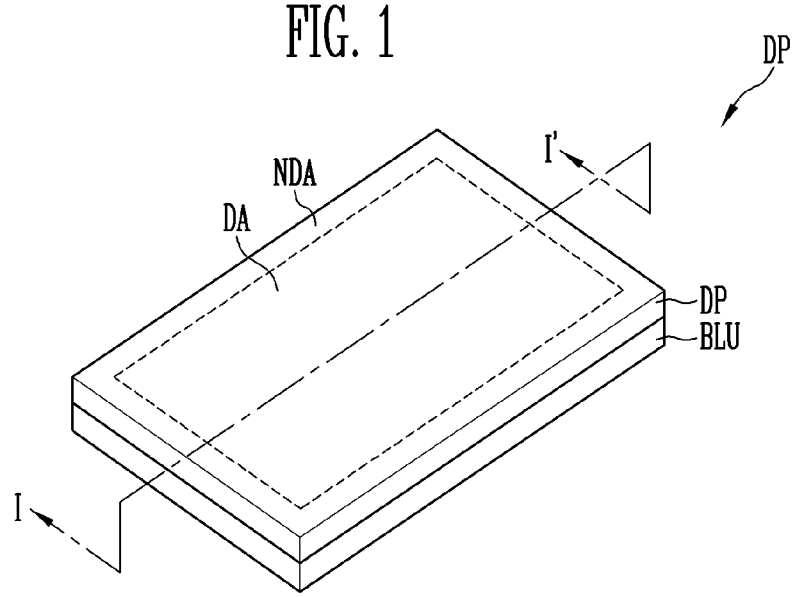
FIG. 1 is a schematic perspective view of a display device according to an exemplary embodiment of the present inventive concept.

It will be apparent to those skilled in the art that various modifications and variations can be made in the present disclosure without departing from the spirit or scope of the disclosure, and specific exemplary embodiments are exemplified in the drawings and explained in the detailed description. This is not intended to limit the present disclosure to a specific disclosure form, and it is intended that the present inventive concept covers the modifications and variations of this inventive concept provided they come within the scope of the present inventive concept and their equivalents.

Like reference numerals designate like elements throughout the specification. In the accompanying drawings, dimensions of structures are exaggerated for clarity. The terms, 'first', 'second' and the like may be simply used for description of various constituent elements, but those meanings may not be limited to the restricted meanings. The above terms are used only for distinguishing one constituent element from other constituent elements. For example, a first constituent element may be referred to as a second constituent element and similarly, the second constituent element may be referred to as the first constituent element within the scope of the appended claims. When explaining the singular, unless explicitly described to the contrary, it may be interpreted as the plural meaning.

In the specification, the word "comprise" or "has" is used to specify existence of a feature, a numbers, a process, an operation, a constituent element, a part, or a combination thereof, and it will be understood that existence or additional possibility of one or more other features or numbers, processes, operations, constituent elements, parts, or combinations thereof are not excluded in advance. In addition, it will be understood that when an element such as a layer, film, region, or substrate is referred to as being "on" another element, it can be directly on the other element or intervening elements may also be present. In the specification, it will be understood that when an element such as a layer, film, region, or substrate is referred to as being disposed "on" another element, the disposed direction is not limited to an upper direction and include a side direction or a lower direction. In contrast, It will be understood that when an element such as a layer, film, region, or substrate is referred to as being "beneath" another element, it can be directly beneath the other element or intervening elements may also be present.

Hereinafter, referring to the accompanying drawings, an exemplary embodiment of the present disclosure will be described in further detail.

Figure 2:
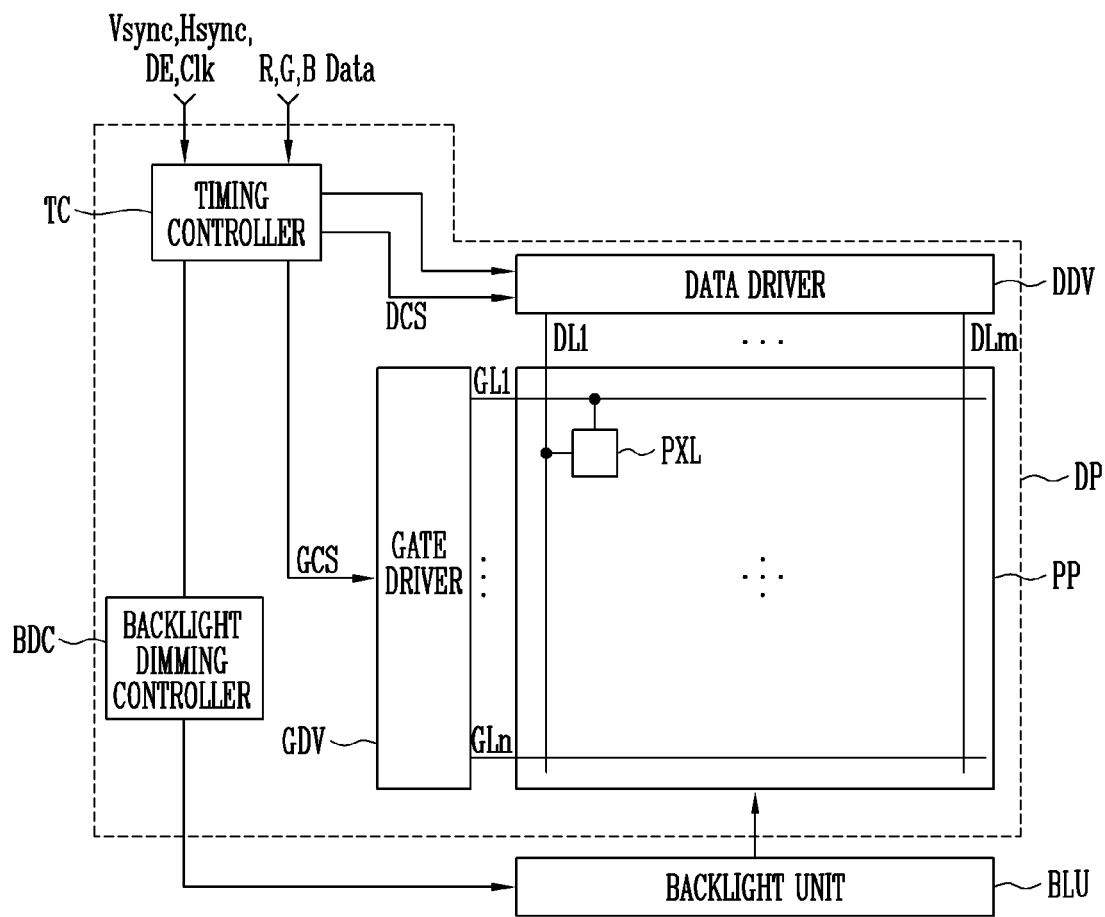
FIG. 2 is a schematic block diagram of a display device according to an exemplary embodiment of the present inventive concept.

FIG. 1 is a schematic perspective view of a display device according to an exemplary embodiment of the present inventive concept, and FIG. 2 is a schematic block diagram of a display device according to an exemplary embodiment of the present inventive concept.

Referring to FIGS. 1 and 2, a display device according to an exemplary embodiment of the present inventive concept may be provided various shapes, for example a rectangular-plate shape having two pairs of sides parallel with each other, but the display device is not limited thereto. In the case where the display device is provided as the rectangular-plate shape, one pair of sides selected from two pairs of sides may be longer than the other pair of sides.

The display device according to an exemplary embodiment of the present inventive concept may include a display panel DP including a plurality of pixel PXL and a backlight unit BLU providing light to the display panel DP. Herein, the display device may be a liquid crystal display in which the pixel PXL is implemented as a liquid crystal display element.

The display panel DP includes a display area DA and a non-display area NDA disposed at least one side of the display area DA.

The display area DA may be an area displaying an image by disposing a pixel unit PP. The display area DA may have various shapes. For example, the display area DA may have a polygon shape including sides made of straight lines.

In addition, the display area DA may have a circular shape or an elliptical shape including a side made of a curved line. In addition, the display area DA may have a semicircular shape or a semi-elliptical shape including sides made of a straight line and a curved line.

The pixel unit PP includes the pixels PXL connected to gate lines GL1-GLn and data lines DL1-DLm. Each pixel PXL may be connected to a corresponding gate line GL1 of the gate lines GL1-GLn and a corresponding data line DL1 of the data lines DL1-DLm. Each pixel PXL may include a thin film transistor, a liquid crystal capacitor, a storage capacitor, and pixel electrode. Each pixel PXL will be described later.

In addition, the non-display area NDA is an area in which no image is displayed. A driver may be disposed in the non-display area NDA. The driver may include a gate driver GDV, a data driver DDV, a timing controller TC, a backlight dimming controller BDC, and the like, and may be disposed on the same substrate as the display area DA or may be disposed on separate element (e.g., a printed circuit board).

The timing controller TC receives a digital video data from an external system (not shown) through interfaces such as a Low Voltage Differential Signaling (LVDS) interface, a Transition Minimized Differential Signaling (TMDS) interface, and the like. In addition, the timing controller TC receives a vertical synchronization signal Vsync, a horizontal synchronization signal Hsync, a data enable signal DE, and a clock signal Clk from the external system. The timing controller TC may generate a gate control signal GCS and a data control signal DCS which respectively control the gate driver GDV and the data driver DDV by using the signals.

The gate driver GDV may apply a scan signal to the gate lines GL1-GLn in response to the gate control signal GCS generated from the timing controller TC. For example, the gate driver GDV may sequentially supply the scan signal to the gate lines GL1-GLn. When the scan signal is sequentially supplied to the gate lines GL1-GLn, the pixels PXL may be selected in units of horizontal lines.

The data driver DDV may supply a data signal of one line for each horizontal period to the data lines DL1-DLm in response to the data control signal DCS generated from the timing controller TC. The data signals applied to the data lines DL1-DLm may be supplied to the pixels PXL selected by the scan signals. For this purpose, the data driver DDV may supply the data signal to the data lines DL1-DLm so as to be synchronized with the scan signal.

The backlight dimming controller BDC may determine a dimming duty of a light source (not shown) disposed in the backlight unit BLU.

The backlight unit BLU is disposed under the display panel DP, and driven by the backlight dimming controller BDC to illuminate the display panel DP.

The backlight unit BLU may include a light source providing light to the display panel DP, and optic members converting light supplied from the light source into surface light.

Although illustrates the backlight unit BLU is shown as a plate shape in the drawing, this is for convenience of description and is not limited thereto. For example, the backlight unit BLU may be formed as a direct type or an edge type.

Figure 3:
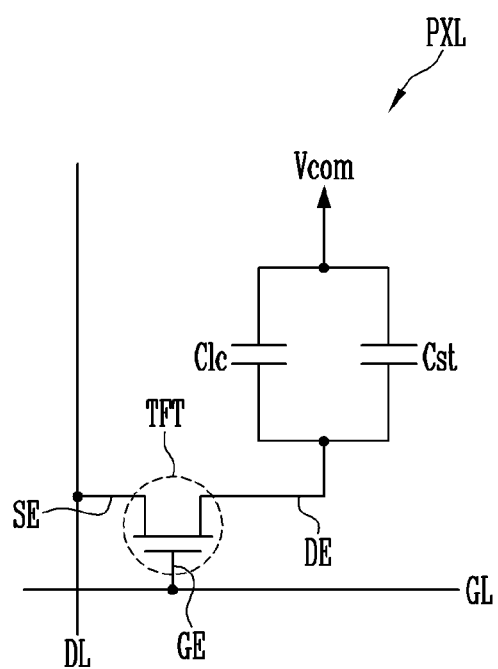
FIG. 3 is an equivalent circuit diagram illustrating an exemplary embodiment of a pixel shown in FIG. 2.
Figure 4A:
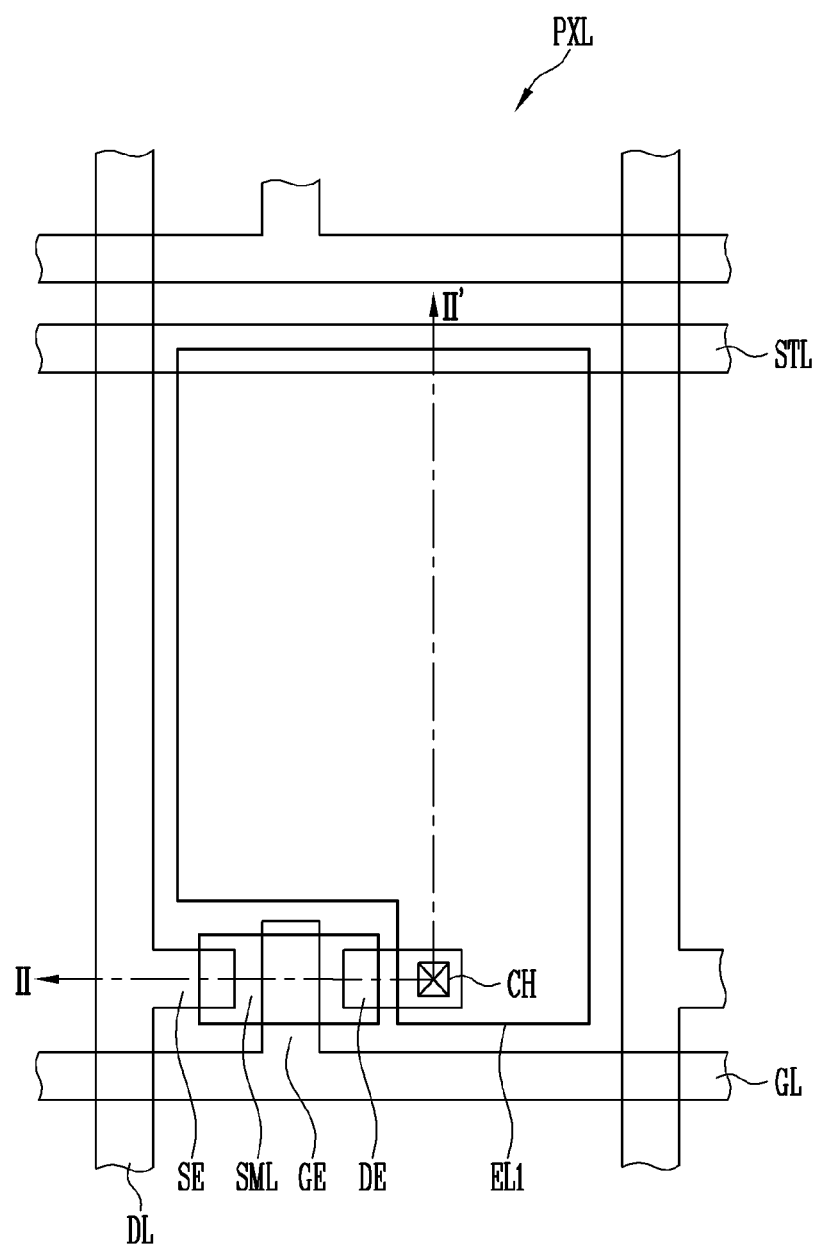
FIG. 4A is a detailed plan view of a pixel shown in FIG. 3.
Figure 4B:
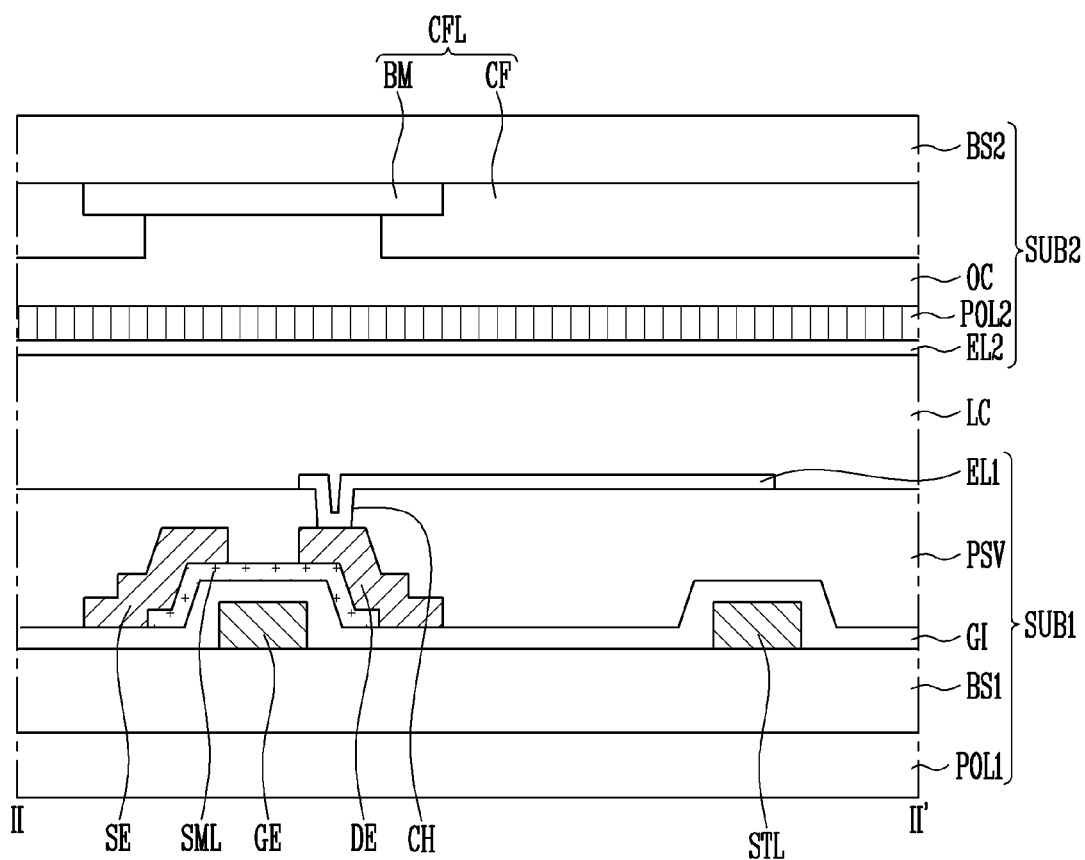
FIG. 4B is a cross-sectional view taken along line II-II' of FIG. 4A.

FIG. 3 is an equivalent circuit diagram illustrating an exemplary embodiment of a pixel shown in FIG. 2, FIG. 4A is a detailed plan view of a pixel shown in FIG. 3, and FIG. 4B is a cross-sectional view taken along line II-II' of FIG. 4A.

A display device according to an exemplary embodiment of the present inventive concept includes a plurality of signal lines and a plurality of pixels connected to the corresponding signal lines and arranged in a matrix form. FIGS. 4A and 4B disclose only one pixel of the pixels. Herein, the pixel is illustrated as a rectangular shape, but is not limited thereto, and may have various shapes.

Referring to FIGS. 3, 4A and 4B, the signal lines include a gate line GL for transmitting a gate signal and a data line DL for transmitting a data signal. The gate line GL extends in a first direction (e.g., a row direction), and the data line DL extends in a second direction (e.g., a column direction) crossing the first direction.

The pixel PXL includes a thin film transistor TFT connected to the gate line GL and the data line DL, a liquid crystal capacitor Clc, and a storage capacitor Cst.

A gate electrode GE of the thin film transistor TFT is connected to the gate line GL, a source electrode SE of the thin film transistor TFT is connected to the data line DL, and a drain electrode DE of the thin film transistor TFT is connected to the liquid crystal capacitor Clc and the storage capacitor Cst connected to a storage line STL.

When the gate signal is applied to the gate electrode GE, the thin film transistor TFT is turned on, and the data signal is stored in the liquid crystal capacitor Clc and the storage capacitor Cst connected together to the drain electrode DE. The storage capacitor Cst charges the data signal and maintains the data signal even after the thin film transistor TFT is turned off.

Referring to FIGS. 4A and 4B, a display device according to an exemplary embodiment of the present inventive concept includes a first substrate SUB1, a second substrate SUB2 facing the first substrate SUB1, and a liquid crystal layer LC disposed between the first substrate SUB1 and the second substrate SUB2.

The first substrate SUB1 may include a first base substrate BS1 including a plurality of pixels (see PXL of FIG. 2), a thin film transistor TFT disposed on the first base substrate BS1, a first electrode EL1 connected to the thin film transistor TFT, and a first polarization layer POL1 disposed under the first base substrate BS1. Herein, each pixel PXL may include the thin film transistor TFT and the first electrode EL1 connected to the thin film transistor TFT.

The first base substrate BS1 may be a rigid substrate or a flexible substrate. The rigid substrate may be one of a glass substrate, a quartz substrate, a glass ceramic substrate, and a crystalline substrate. The flexible substrate may be one of a film substrate including a polymer organic material and a plastic substrate. It is preferable that a material applied to the first base substrate BS1 has resistance (or heat resistance) to a high processing temperature in a manufacturing process.

A gate line unit may be disposed on the first base substrate BS1. The gate line unit includes a gate line GL, a gate electrode GE connected to the gate line GL, and the storage line STL.

The gate line unit may be made of a metal. For example, the gate line unit may be made of at least one of metals such as gold (Au), silver (Ag), aluminum (Al), molybdenum (Mo), chromium (Cr), titanium (Ti), nickel (Ni), neodymium (Nd), copper (Cu), or alloys of the metals. In addition, the gate line unit may be formed of a single layer, but embodiment is not limited thereto. The gate line unit may be formed of a multiple layer in which two or more of the metals and the alloys are stacked.

A buffer layer (not shown) is disposed between the first base substrate BS1 and the gate line unit. The buffer layer prevents impurities from diffusing into the thin film transistor TFT. The buffer layer may have a single layer or at least two or more multiple layer. The buffer layer may be an inorganic insulating layer made of an inorganic material. For example, the buffer layer may be formed of silicon nitride, silicon oxide, silicon oxynitride, or the like. When the buffer layer is a multiple layer, each layer may be formed of the same material or may be formed of different material. The buffer layer may be omitted according to a material of the first base substrate BS1 and a process condition.

A gate insulating layer GI is disposed on the gate line unit. The gate insulating layer GI may be an inorganic insulating layer made of an inorganic material. The inorganic material may include polysiloxane, silicon nitride, silicon oxide, silicon oxynitride, or the like.

A semiconductor layer SML is disposed on the gate insulating layer GI. The semiconductor layer SML may be provided in a thin film shape on the gate insulating layer GI. The semiconductor layer SML is disposed on the gate electrode GE and may overlap at least a portion of the gate electrode GE. The semiconductor layer SML may be a semiconductor pattern made of polysilicon, amorphous silicon, oxide semiconductor, or the like.

A data line unit is disposed on the semiconductor layer SML. The data line unit includes a data line DL, a source electrode SE, and a drain electrode DE spaced apart from the source electrode SE. The source electrode SE may cover one side of the semiconductor layer SML, and the drain electrode DE may also cover the opposite side facing the one side of the semiconductor layer SML.

The data line unit may be made of a conductive material, for example a metal. The data line unit may be formed of a single metal, or may be formed of two or more kinds of metals or alloys of two or more kinds of metals. For example, the source electrode SE and the drain electrode DE may be made of nickel, chromium, molybdenum, aluminum, titanium, copper, tungsten, and an alloy thereof. In addition, each of the source electrode SE and the drain electrode DE may be formed of a single layer or a multiple layer. For example, each of the source electrode SE and the drain electrode DE may be formed of a double layer made of titanium and copper.

A passivation layer PSV is disposed on the data line unit. The passivation layer PSV may be formed of an inorganic insulating layer made of an inorganic material or an organic insulating layer made of an organic material. The inorganic material may include polysiloxane, silicon nitride, silicon oxide, silicon oxynitride, or the like. The organic material may include an organic insulating material such as a polyacryl-based compound, a polyimide-based compound, a fluorocarbon compound such as Teflon, a benzocyclobutene compound, and the like. The passivation layer PSV may include a contact hole exposing a portion of the drain electrode DE.

The first electrode EL1 is disposed on the passivation layer PSV. The first electrode EL1 is connected to the drain electrode DE through the contact hole CH. The first electrode EL1 may be formed of a transparent conductive material. In particular, the first electrode E1 may be formed of a transparent conductive oxide. The transparent conductive oxide may include an indium tin oxide (ITO), an indium zinc oxide (IZO), an indium tin zinc oxide (ITZO), or the like.

The first polarizer POL1 is disposed on a back surface of the first base substrate BS1 (for example, a surface on which the thin film transistor TFT is not disposed).

The first polarizer POL1 polarizes light in a specific direction and provides the light to the liquid crystal layer LC while minimizing a loss of light provided from a backlight unit (not shown).

The first electrode EL1 partially overlaps the storage line STL, and the first electrode EL1 and the storage line STL constitutes the storage capacitor Cst with the passivation layer PSV disposed therebetween.

The second substrate SUB2 includes a second base substrate BS2, a color conversion layer CFL disposed on the second base substrate BS2, an overcoat layer OC disposed on the color conversion layer CFL, a second polarization layer POL2 disposed on the overcoat layer OC, and a second electrode EL2 disposed on the second polarization layer POL2.

The second base substrate BS2 may be formed of a transparent insulating material, for example, glass, silicon, quartz, plastic, or the like, and may have flexibility. In an exemplary embodiment of the present inventive concept, the second base substrate BS2 may be made of the same material as the first base substrate BS1.

The color conversion layer CFL transmits or converts light so that light provided from the backlight unit displays a specific color for each pixel PXL.

The color conversion layer CFL may include a plurality of color filters CF displaying different colors depending on each pixel, and a black matrix BM disposed between color filters CF.

The black matrix BM is formed between the color filters CF in the display area, and blocks light passing through the liquid crystal layer LC between adjacent pixels.

An overcoat layer OC is disposed on the color conversion layer CFL. The overcoat layer OC may be made of an insulating material including epoxy polymer. In an exemplary embodiment of the present inventive concept, the overcoat layer is disposed on the color conversion layer CFL to planarize an upper surface of the color conversion layer CFL. For this purpose, the overcoat layer is formed of an epoxy material which can planarize before curing regardless of topography of the upper surface of the color conversion layer CFL and a good reflow characteristic when curing.

The epoxy polymer includes a cardo-based binder resin, an epoxy-based monomer, and a bisphenol-based resin. The epoxy polymer is provided in a total amount of 100 parts by weight, and the amount of the cardo-based binder resin, the epoxy-based monomer, and the bisphenol-based resin may be changed in a range of 1 to 50 parts by weight, 1 to 50 parts by weight, and 1 to 50 parts by weight, respectively.

The cardo-based binder resin may be a compound represented by Chemical Formula 1.

formed. When a Tg of the epoxy-based monomer is lower than 120° C., the epoxy-based monomer may have low heat resistance, and when the Tg is higher than 200° C., a modification of the epoxy-based monomer may occur.

The epoxy-based monomer may include at least one of compounds represented by Chemical Formula 2.

[Chemical Formula 2]

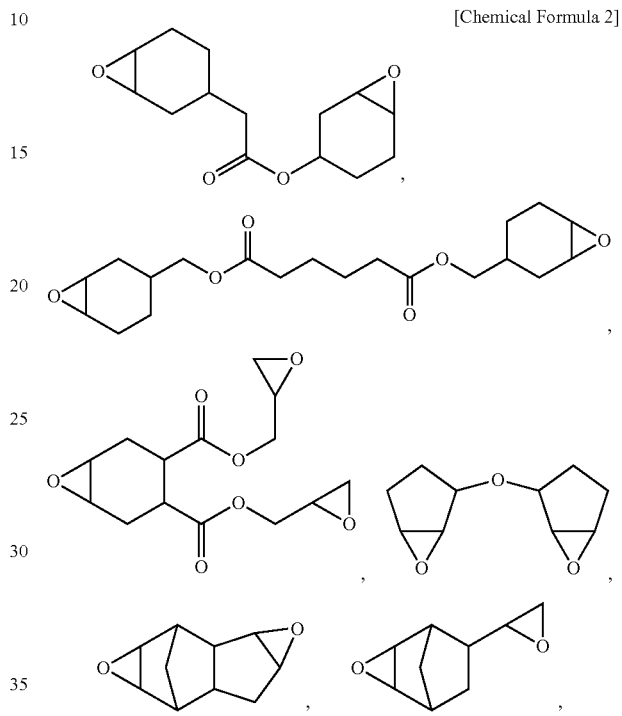

[Chemical Formula 1]

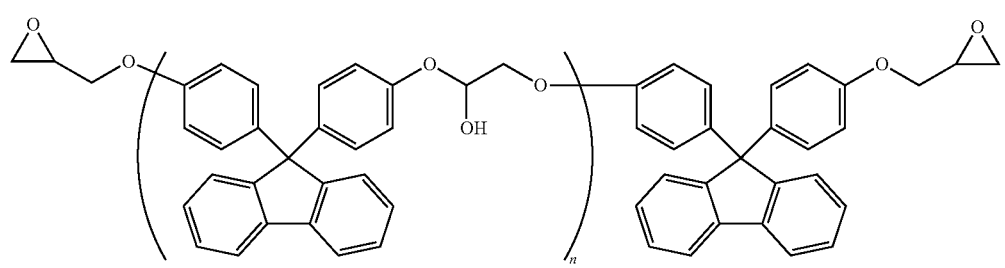

Herein, n is a natural number in which the cardo-based binder resin has a molecular weight of 5,000 to 20,000. When the molecular weight of the cardo-based binder resin is 5,000 or less, viscosity is too low, and when the molecular weight of the cardo-based binder resin exceeds 20,000, viscosity is too high, which may cause printing defects.

In an exemplary embodiment of the present inventive concept, the epoxy polymer may contain 20 to 40 parts by weight of the cardo-based binder resin. The epoxy-based monomer may have a molecular weight of about 100 to about 400, and may have a glass transition temperature (Tg) of about 120° C. to about 200° C. If the molecular weight of the epoxy-based monomer is small or excessively large, reflow characteristic deteriorates when the overcoat layer is -continued

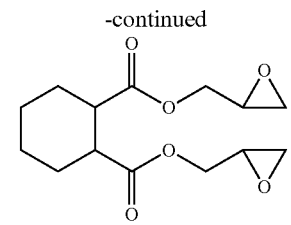

In an exemplary embodiment of the present inventive concept, the epoxy polymer may contain 10 to 30 parts by weight of the epoxy-based monomer.

The bisphenol-based resin may be a bisphenol A-based resin. The bisphenol A-based resin may be contained in the epoxy polymer in an amount of 15 to 25 parts by weight.

In an exemplary embodiment of the present inventive concept, the epoxy polymer may further include at least one of a bisphenol F-based resin, a novolac resin, and an aliphatic epoxy resin in addition to the cardo-based binder resin, the epoxy-based monomer, and the bisphenol A-based resin. Herein, at least one of the bisphenol F-based resin, the novolac resin, and the aliphatic epoxy resin may be contained in an amount of 20 to 30 parts by weight.

In an exemplary embodiment of the present inventive concept, the epoxy polymer includes a curing agent for curing a cardo-based epoxy binder, an epoxy-based monomer, a bisphenol-based resin, or the like. The curing agent may be contained in an amount of 60 to 120 parts by weight based on 100 parts by weight of the epoxy polymer.

The curing agent may be a compound represented by Chemical Formula 3.

[Chemical Foromula 3]

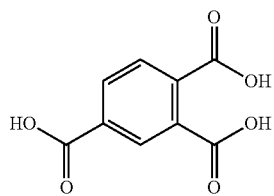

The second polarization layer POL2 is disposed on the overcoat layer OC. The second polarization layer POL2 may polarize light passing through the first polarization layer POL1 and the liquid crystal layer LC in a specific direction to provide the light to the color conversion layer CFL. Herein, in an exemplary embodiment of the present inventive concept, the second polarization layer POL2 may be a wire grid polarizer in which line lattice patterns (not shown) are spaced apart from each other by a predetermined distance. In other exemplary embodiment of the present inventive concept, the second polarization layer POL2 may be an attaching type polarization layer or a coating type polarization layer, but is not limited thereto.

The second electrode EL2 is disposed on the first polarization layer POL2. The second electrode EL2 is a common electrode forming an electric field together with the first electrode EL1. The second electrode EL2 is formed of a transparent conductive material. For example, the second electrode EL2 may be formed of conductive metal oxide such as an indium tin oxide (ITO), an indium zinc oxide (IZO), an indium tin zinc oxide (ITZO), or the like.

The second electrode EL2 generates an electric field together with the first electrode EL1 to drive the liquid crystal layer LC.

The liquid crystal layer LC is disposed between the first substrate SUB1 and the second substrate SUB2, more particularly between the first electrode EL1 and the second electrode EL2.

Although not shown, an alignment layer may be disposed between the first substrate SUB1 and the liquid crystal layer LC and/or between the second substrate SUB2 and the liquid crystal layer LC. The alignment layer may align liquid crystal molecules in the liquid crystal layer LC in a specific direction. For example, a first alignment layer is disposed between the first substrate SUB1 and the liquid crystal layer LC, and a second alignment layer is disposed between the second substrate SUB2 and the liquid crystal layer LC.

The liquid crystal layer LC includes liquid crystal molecules having a negative dielectric anisotropy, and displays an image by changing a transmittance of light based on an electric field formed between the pixel electrode and the common electrode.

In the liquid crystal display device, when the gate signal is applied to the gate line, the thin film transistor is turned on. Therefore, the data signal applied to the data line is applied to the first electrode through the thin film transistor. When the thin film transistor is turned on and the data signal is applied to the first electrode, an electric field is formed between the first electrode and the second electrode. The liquid crystal molecules are driven by the electric field generated due to a difference between a voltage applied to the second electrode and a voltage applied to the first electrode. Accordingly, an amount of light passing through the liquid crystal layer is changed to display an image.

Figure 5:
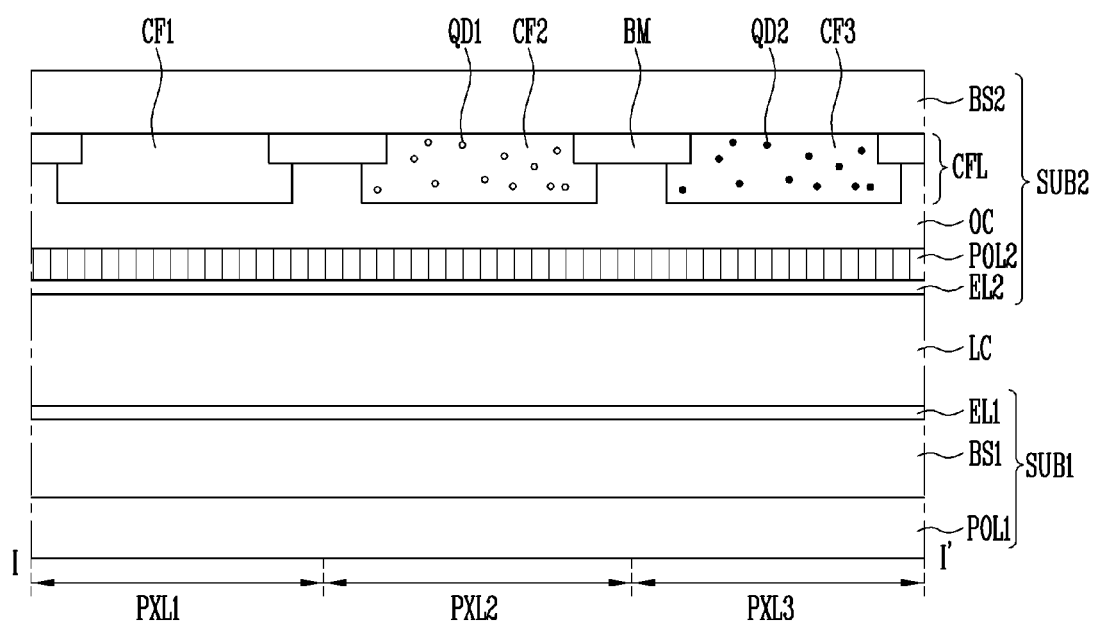
FIG. 5 is a schematic cross-sectional view of three adjacent pixels in a display device according to an exemplary embodiment of the present inventive concept.

FIG. 5 is a schematic cross-sectional view of three adjacent pixels in a display device according to an exemplary embodiment of the present inventive concept.

In FIG. 5, constituent elements between the first base substrate BS1 and the first electrode EL1 of the first substrate SUB1 have been omitted for convenience of description. Hereinafter, it will be mainly described based on what are not described above to avoid repetitive description.

Referring to FIG. 5, a display device according to an exemplary embodiment of the present inventive concept may include a plurality of pixels displaying different colors. For example, a display device according to an exemplary embodiment of the present inventive concept may include first to third pixels PXL1, PXL2, and PXL3 providing different color images. The first to third pixels PXL1, PXL2, and PXL3 may include first to third color filters CF1, CF2, and CF3 which respectively represents first to third colors which are different colors each other in the color conversion layer CFL. Colors represented by the first to third color filters CF1, CF2, and CF3 may be respectively blue, green, and red. However, the colors represented by the color filters are not limited thereto, and various colors such as white, yellow, cyan, magenta, and the like may be displayed.

The color conversion layer CFL may include a light conversion material which absorbs light emitted from a backlight unit and then converts the light into light of other color. In an exemplary embodiment of the present inventive concept, when the light emitted from the backlight unit is referred to as first light, the light conversion material can convert the first light into second light or third light having a wavelength different from that of the first light. The kind of the light conversion material is not particularly limited as long as it can absorb light of a wavelength band emitted from the backlight unit and emit light of a different wavelength band. In an exemplary embodiment of the present inventive concept, the light conversion material may be phosphor or a quantum dot. In particular, the quantum dot can emit green light and red light having a narrow full width of half maximum (FWHM) as compared with phosphor generally used as a light conversion material, thereby increasing a color reproduction ratio. Therefore, the light conversion material may be the quantum dot.

The quantum dot may be selected from a group II-VI compound, a group III-V compound, a group IV-VI compound, a group IV element, a group IV compound, and a combination thereof.

The group II-VI compound may be selected from: a group of two-element compounds selected from CdSe, CdTe, ZnS, ZnSe, ZnTe, ZnO, HgS, HgSe, HgTe, MgSe, MgS, and a mixture thereof; a group of three-element compounds selected from CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof, and a group of four-element compounds selected from HgZnTeS, CdZnSeS, CdZnSeTe, CdZnSTe, CdHgSeS, CdHgSeTe, CdHgSTe, HgZnSeS, HgZnSeTe, HgZnSTe, and a mixture thereof. The group III-V compound may be selected from: a group of two-element compounds selected from GaN, GaP, GaAs, GaSb, AlN, AlP, AlAs, AlSb, InN, InP, InAs, InSb, and a mixture thereof; a group of three-element compounds selected from GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and a mixture thereof; and a group of four-element compounds selected from GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a mixture thereof. The group IV-VI compound may be selected from: a group of two-element compounds selected from SnS, SnSe, SnTe, PbS, PbSe, PbTe, and a mixture thereof; a group of three-element compounds selected from SnSeS, SnSeTe, SnSTe, PbSeS, PbSeTe, PbSTe, SnPbS, SnPbSe, SnPbTe, and a mixture thereof, and a group of four-element compounds selected from SnPbSSe, SnPbSeTe, SnPbSTe, and a mixture thereof. The group IV element may be selected from a group of Si, Ge, and a mixture thereof. The group IV compound may be a two-element compound selected from a group of SiC, SiGe, and a mixture thereof.

At this time, the two-element compounds, the three-element compounds or the four-element compounds may be present in a particle at the same concentration, or may be present in the same particle at a partially different concentration. In addition, the quantum dot may have a core/shell structure in which one quantum dot surrounds other quantum dot. An interface between a core and a shell may have a concentration gradient in which a concentration of an element existing in the shell becomes lower toward the center.

The quantum dot may have a full width of half maximum (FWHM) of a emission wavelength spectrum of about 45 nm or less, preferably about 40 nm or less, more preferably about 30 nm or less, and color purity or color reproducibility may be improved in this range. In addition, light emitted through the quantum dot is emitted in all directions, so that a viewing angle may be improved.

In addition, a shape of the quantum dot is not limited to a shape commonly used in the art, and may be in a shape of spherical, pyramidal, multi-arm, or cubic nanoparticle, nanotube, nanowire, nanofiber, nanoplate particle, and the like.

In an exemplary embodiment of the present inventive concept, when the first light emitted from the backlight unit is blue light, the first color filter CF1 may represent a blue color by transmitting the first light. In this case, since a wavelength band of the first light does not need to be converted in the first color filter CF1, a separate light conversion material may not be required in the first color filter CF1. However, the first color filter CF1 may further include a material for increasing color purity if necessary. According to an exemplary embodiment of the present inventive concept, the first color filter CF1 may further include a blue dye or blue pigment representing a blue color. In an exemplary embodiment of the present inventive concept, the first color filter CF1 may further include an additional material for improving uniformity of the light emitted from the first color filter CF1, light emitted from a second color filter CF2 and third color filter CF3 which will be described later. For example, the first color filter CF1 may further include scatterers for controlling light distribution of light transmitting the first color filter CF1. The scatterers may be made of various materials, for example titanium oxide (TiO2). By providing the scatterers to the first color filter CF1, a scattering/emission distribution in the first color filter CF1 may be substantially similar to a Lambertian scattering/emission distribution by the quantum dot in a second color filter CF2 and third color filter CF3, which will be described later.

The second color filter CF2 may include a light conversion material which absorbs the first light to represent the second light, i.e., green light. Herein, the light conversion material may be a first quantum dot QD1 which absorbs blue light and then, emits green light.

The third color filter CF3 may include a light conversion material which absorbs the first light to represent the third light, i.e., red light. Herein, the light conversion material may be a second quantum dot QD2 which absorbs blue light and then, emits red light.

Herein, each of the first quantum dot QD1 and the second quantum dot QD2 may be selected from one or more of the quantum dots described above.

As described above, since the light source of the backlight unit and the first to third color filters CF1, CF2, and CF3 may be used to represent blue, green and red colors, a display device may display color images.

Hereinafter, a method for manufacturing a liquid crystal display device having the above structure will be described.

FIGS. 6A to 6F are cross-sectional views sequentially illustrating a method for manufacturing a display device according to an exemplary embodiment of the present inventive concept.

Figure 6A:
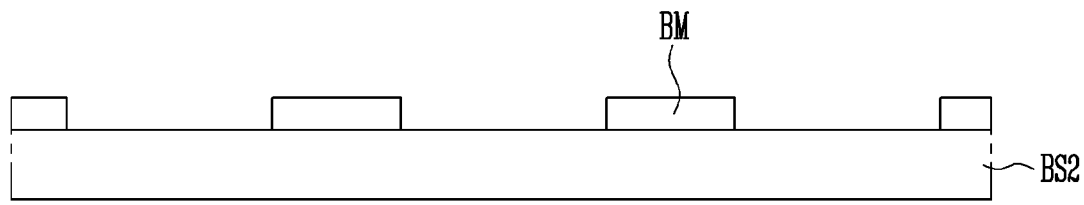
FIGS. 6A, 6B, 6C, 6D, 6E and 6F are cross-sectional views sequentially illustrating a method for manufacturing a display device according to an exemplary embodiment of the present inventive concept.

Referring to FIG. 6A, a second substrate SUB2 is prepared and a black matrix BM is formed on the second substrate SUB2. The black matrix BM may be formed of carbon, titanium oxide, iron oxide, or a mixture thereof. However, the type of the black matrix BM is not limited to materials for blocking light. The black matrix BM may be formed by forming the materials on the second base substrate BS2 and patterning the materials by a photolithography process, but embodiments are not limited thereto.

Figure 6B:
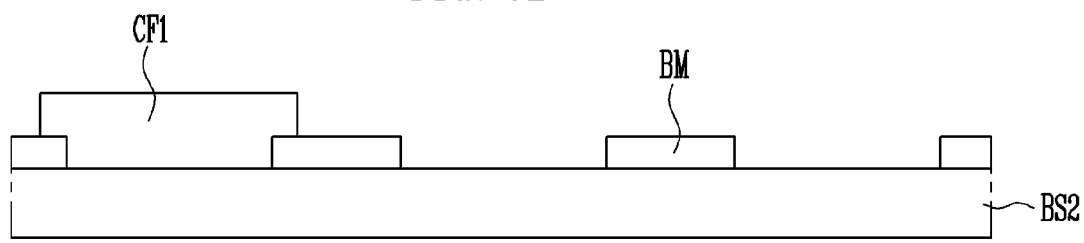

Referring to FIG. 6B, a first color filter CF1 is formed on the second substrate SUB2. The first color filter CF1 is formed at a position corresponding to a first pixel. In a cross-section view, the first color filter CF1 may partially overlap the black matrix BM disposed on both sides thereof. The first color filter CF1 may be made of a material which transmits light. In an exemplary embodiment of the present inventive concept, the first color filter CF1 may be formed by using an inkjet, a slit coating, photolithography, and the like, but is not limited thereto.

Figure 6C:
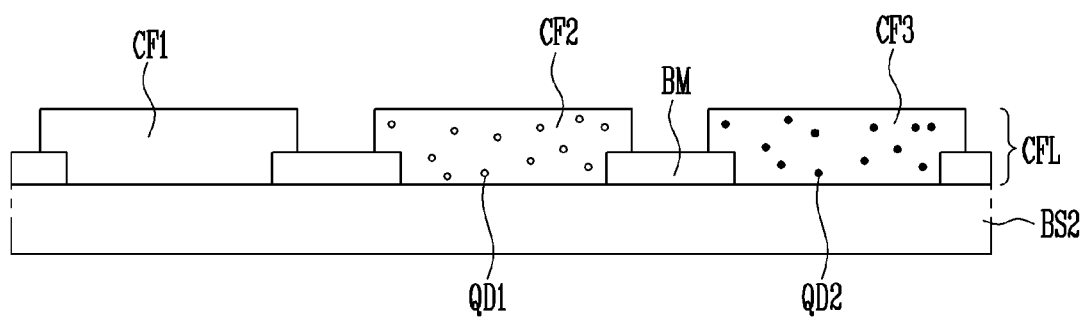

Referring to FIG. 6C, a second color filter CF2 and a third color filter CF3 are formed on the second substrate SUB2. The second color filter CF2 and the third color filter CF3 may be formed separately or simultaneously, and each of the second color filter CF2 and the third color filter CF3 may include a different light conversion material (e.g., a quantum dot). The second color filter CF2 and the third color filter CF3 may be formed by using an inkjet, a slit coating, a photolithography, and the like, but is not limited thereto. The first color filter CF1, the second color filter CF2 and the third color filter CF3 may be formed simultaneously, for example, using an inkjet.

Figure 6D:
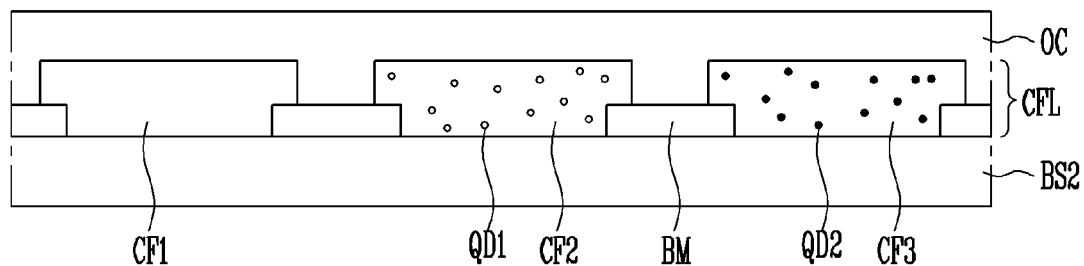

Referring to FIG. 6D, an overcoat layer OC is formed on a color conversion layer CFL which made of the black matrix BM and the first to third color filters CF1, CF2, and CF3.

The overcoat layer OC may be manufactured by forming a composition for forming an epoxy polymer on the second substrate SUB2 and curing the composition through a baking process. The baking process may proceed in a single process or in a multiple process. The curing process may be performed in a manner which applies heat to the composition.

The composition may include a solvent and a solid including an epoxy-based material dispersed in the solvent. In an exemplary embodiment of the present inventive concept, the solvent may be contained in an amount of about 73 wt % to 80 wt %, and the solid may be contained in an amount of about 20 wt % to 27 wt %, based on 100 wt % of a solution.

In an exemplary embodiment of the present inventive concept, the type of the solvent is not particularly limited, and various solvents in the art may be used. For example, the solvent may include ketones such as acetone, methyl ethyl ketone and cyclohexanone, acetic acid esters such as ethyl acetate, butyl acetate, cellosolve acetate, propylene glycol monomethyl ether acetate and carbitol acetate, carbitols such as cellosolve and butyl carbitol, aromatic hydrocarbons such as solvent naphtha, toluene and xylene, amide solvents such as dimethylformamide, dimethylacetamide and N-methylpyrrolidone, and a combination of two or more thereof.

In an exemplary embodiment of the present inventive concept, the solid include a cardo-based binder resin, an epoxy-based monomer, a bisphenol-based resin, and a curing agent. An epoxy polymer includes a cardo-based binder resin, an epoxy-based monomer, and a bisphenol-based resin, and may be provided in an amount of 100 parts by weight. The curing agent may be provided in an amount of 60 to 120 parts by weight based on 100 parts by weight of the epoxy polymer. Herein, the cardo-based binder resin, the epoxy-based monomer, and the bisphenol-based resin may be respectively provided in an amount of 1 to 50 parts by weight, 1 to 50 parts by weight, and 1 to 50 parts by weight, based on 100 parts by weight of the epoxy polymer.

Since the composition is provided with a fluid having a predetermined viscosity, the composition may be coated on the color filters and fill gaps between adjacent color filters to have a flattened surface. The composition is then reflowed during a thermal curing process to further planarize the surface of the composition. Herein, since the composition includes the epoxy polymer, a shrinkage rate of the composition is low. Therefore, the overcoat layer OC is formed to have a planarized surface.

The solvent is removed during the curing process.

Figure 6E:
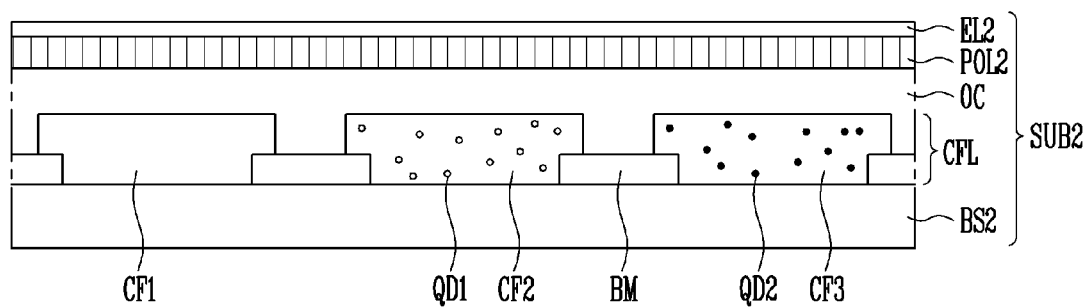

Referring to FIG. 6E, a second polarization layer POL2 and a second electrode EL2 is sequentially formed on the second substrate SUB2 in which the overcoat layer OC is formed. The second polarization layer POL2 may be manufactured by using an imprint process, a photolithography, or the like. In an exemplary embodiment of the present inventive concept, the second polarization layer POL2 may be particularly manufactured by the imprint process. In the case where the second polarization layer POL2 is manufactured by the imprint process, if a step in an underlying layer is large, a pattern formed by the imprint process may be easily peeled off. However, according to an exemplary embodiment of the present inventive concept, in a step of forming the overcoat layer OC described above, the overcoat layer OC is made of the material including the epoxy polymer which has a low shrinkage rate when curing, thereby improving a flatness of an upper surface of the overcoat layer OC, and in the case where the second polarization layer POL2 is manufactured by the imprint process, a peeling of the second polarization layer POL2 may be remarkably decreased.

The second electrode EL2 may be manufactured by a photolithography or the like.

A manufacturing method of the second polarization layer POL2 and/or the second electrode EL2 is not limited thereto, and the second polarization layer POL2 and/or the second electrode EL2 may be manufactured by using various methods in the art.

Figure 6F:
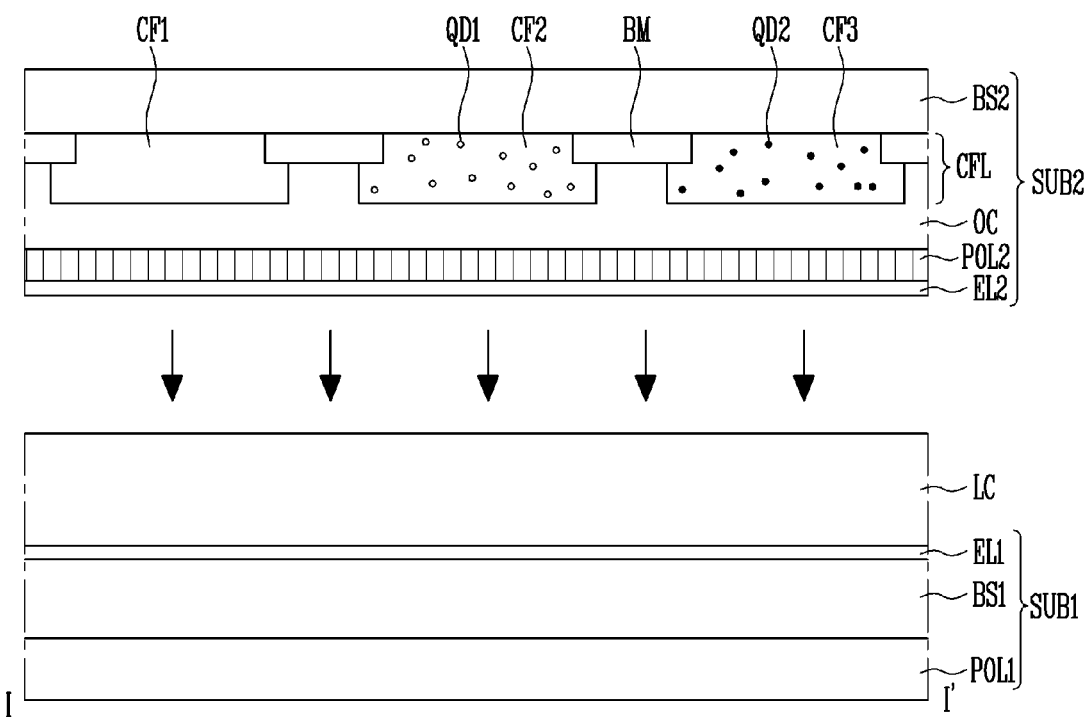

Referring to FIG. 6F, the second substrate SUB2 having the second electrode EL2 is combined to the first substrate SUB1 with the liquid crystal layer disposed therebetween. When the first substrate SUB1 and the second substrate SUB2 are combined to each other, the first electrode EL1 and the second electrode EL2 are combined so as to face each other with the liquid crystal layer disposed therebetween. Herein, the first substrate SUB1 may be separately manufactured from the second substrate SUB2, and may be manufactured by using a plurality of photolithography processes or the like.

Thereafter, the first polarization layer POL1 may be formed on a back surface of the first base substrate BS1. The first polarization layer POL1 may be directly formed on the back surface of the first base substrate BS1, or may be separately manufactured and disposed on the back surface of the first base substrate BS1.

Figure 7:
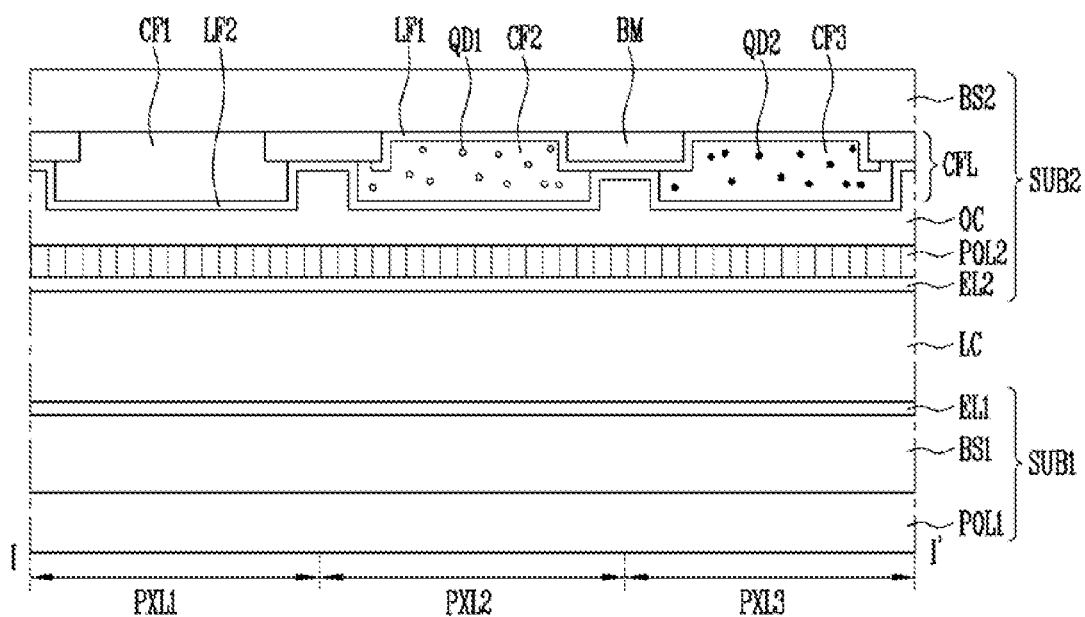
FIG. 7 is a cross-sectional view of a display device according to other exemplary embodiment of the present inventive concept.

FIG. 7 is a cross-sectional view of a display device according to other exemplary embodiment of the present inventive concept. Hereinafter, in order to avoid repetitive description, a difference in other exemplary embodiment from the exemplary embodiment described above will be mainly described.

A display device according to an exemplary embodiment of the present inventive concept may include additional elements for maximizing a light efficiency of light emitted from a light source of a backlight unit. According to an exemplary embodiment of the present inventive concept, the second substrate SUB2 may have a light filter layer which blocks or reflects specific light.

Referring to FIG. 7, a light filter layer for blocking specific light may be disposed between the second base substrate BS2 and the color filters.

In an exemplary embodiment of the present inventive concept, a second light filter layer LF2 may be disposed between the overcoat layer OC and the color conversion layer CFL. The second light filter layer LF2 may transmit light of a predetermined wavelength (e.g., light of a wavelength corresponding to the first light), and may reflect or absorb light of other wavelength except for the predetermined wavelength (e.g., light of a wavelength corresponding to the second light and the third light). In an exemplary embodiment of the present inventive concept, the second light filter layer LF2 transmits blue light, which is the first light, and absorbs or reflects light other than the blue light, for example green light or red light. In addition, the second light filter layer LF2 reflects light traveling in a lower direction of light emitted from quantum dots of the second color filter CF2 and the third color filter CF3 to be described later, so that the light emitted from the quantum dots is emitted to the outside.

The second light filter layer LF2 may be made of a single-layered or multi-layered insulating layer. For example, the second light filter layer LF2 may be made of a multi-layered insulating layer, in which two insulating layers having different refractive indexes may be alternatively disposed. An insulating material having a high refractive index and an insulating material having a low refractive index may be used as the two insulating layers composing the second light filter layer LF2. The insulating material having a high refractive index may include titanium oxide (TiOx), tantalum oxide (TaOx), hafnium oxide (HfOx), zirconium oxide (ZrOx), silicon nitride (SiNx), and the like, and the insulating material having a low refractive index may include silicon oxide (SiOx), silicon carbon oxide (SiCOx), and the like. However, the insulating material composing the second light filter layer LF2 is not limited thereto, and various insulating materials can be used. In an exemplary embodiment of the present inventive concept, the second light filter layer LF2 may be a multilayer in which an insulation layer made of silicon oxide (SiOx) and an insulation layer made of silicon nitride (SiNx) are alternatively disposed. The silicon oxide and the silicon nitride may be formed in various methods, for example a chemical vapor deposition.

In an exemplary embodiment of the present inventive concept, the first light filter layer LF1 for reflecting or blocking the second light and the third light may be further provided in the second substrate SUB2. The first light filter layer LF1 may transmit light of a predetermined wavelength (e.g., light of a wavelength corresponding to the second light and the third light), and may reflect or absorb light of other wavelength except for the predetermined wavelength (e.g., light of a wavelength corresponding to the first light).

For example, the first light filter layer LF1 may absorb or reflect blue light not absorbed by quantum dots and may transmit green light and red light converted by the second color filter CF2 and the third color filter CF3, respectively. In other word, the first light filter layer LF1 may prevent the blue light not absorbed by the quantum dot from traveling in an upper direction, and particularly may reflect the first light traveling in the upper direction so that the quantum dot can absorb the blue light again.

Herein, the first light filter layer LF1 may be a yellow color filter for blocking blue light. The first light filter layer LF1 may be disposed only in a region corresponding to the second color filter CF2 and the third color filter CF3, more particularly may be disposed between the second color filter CF2 and the second substrate SUB2, and between the third color filter CF3 and the second substrate SUB2.

The first light filter layer LF1 may be manufactured in a manner similar to a manufacturing method of the second light filter layer LF2. That is, the first light filter layer LF1 may be made of a single-layered or multi-layered insulating layer. When the first light filter layer LF1 is made of a multi-layered insulating layer, two insulating layers having different refractive indexes may be alternatively disposed. An insulating material having a high refractive index and an insulating material having a low refractive index may be used as the two insulating layers composing the first light filter layer LF1. As the insulating material having different refractive indexes, various insulating materials may be used as described in the material of the second light filter layer LF2, and by adjusting a type and a thickness of the material, the first light filter layer LF1 may be manufactured to absorb or reflect light of a wavelength different from that of the second light filter layer LF2.

The first light filter layer LF1 and the second light filter layer LF2 described above are provided on the second substrate SUB2 so that light emitted from the backlight unit and reaching thereto is visible to user's eyes with high efficiency through the color conversion layer CFL, thereby displaying an image of a high quality.

FIGS. 8A to 8G are cross-sectional views sequentially illustrating a method for manufacturing a second substrate SUB2 of a display device shown in FIG. 7.

Figure 8A:
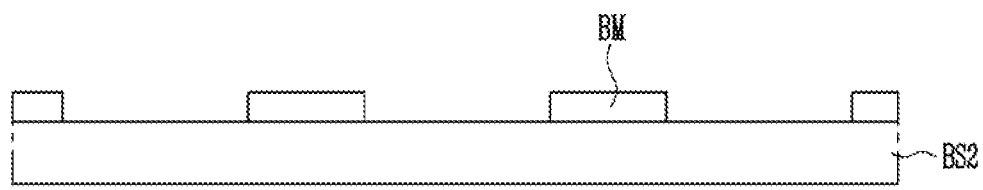
FIGS. 8A, 8B, 8C, 8D, 8E, 8F and 8G are cross-sectional views sequentially illustrating a method for manufacturing a second substrate of a display device shown in FIG. 7.

Referring to FIG. 8A, a black matrix BM is formed on a second substrate SUB2.

Figure 8B:
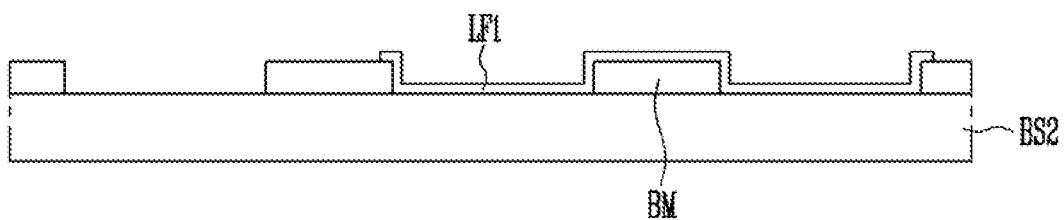

Referring to FIG. 8B, a first light filter layer LF1 is formed on the second substrate SUB2 in which the black matrix BM is formed. The first light filter layer LF1 is formed in a region corresponding to a second pixel and a third pixel. The first light filter layer LF1 may be made of a yellow resin. The first light filter layer LF1 may be formed by a printing process, a coating process, a photolithography process, or the like, and may be formed by the photolithography process, particularly when the first light filter layer LF1 has photosensitivity.

Figure 8C:
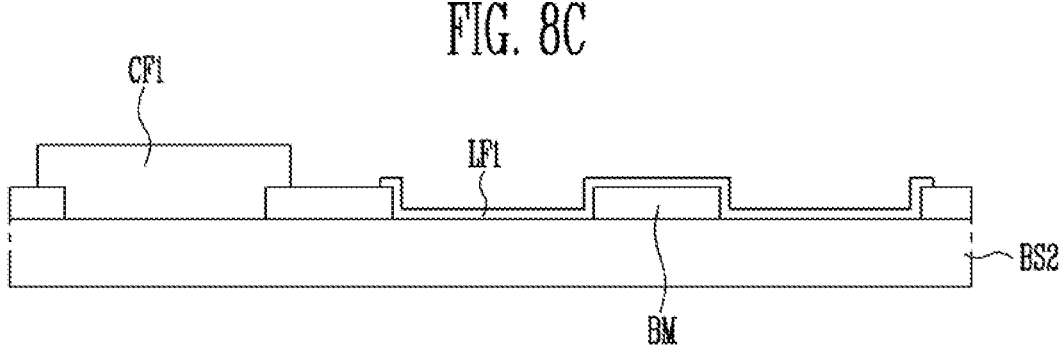

Referring to FIG. 8C, a first color filter CF1 is formed on the second substrate SUB2. The first color filter CF1 is formed at a position corresponding to the first pixel.

Figure 8D:
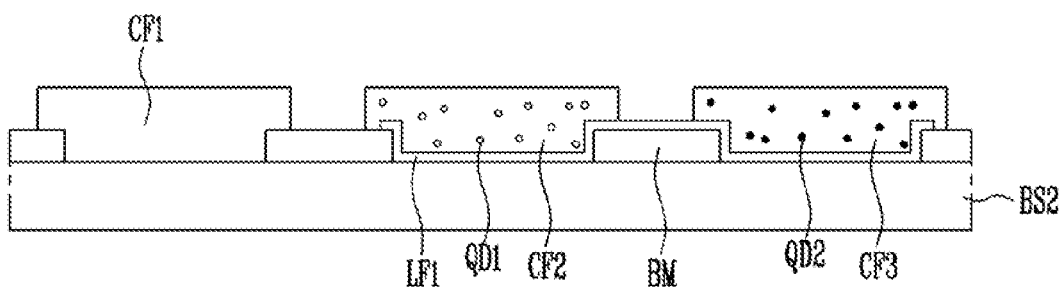

Referring to FIG. 8D, a second color filter CF2 and a third color filter CF3 are formed on the second substrate SUB2. The first color filter CF1, the second color filter CF2 and the third color filter CF3 may be formed simultaneously, for example, using an inkjet.

Figure 8E:
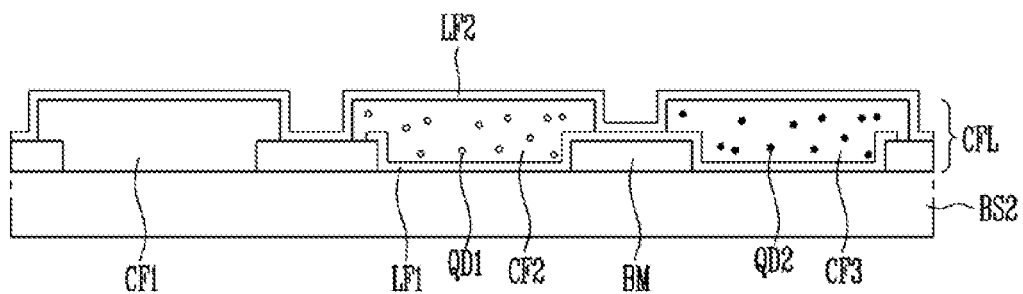

Referring to FIG. 8E, a second light filter layer LF2 is formed on the first to third color filters CF1, CF2, and CF3. The second light filter layer LF2 may be formed by using a deposition process.

Figure 8F:
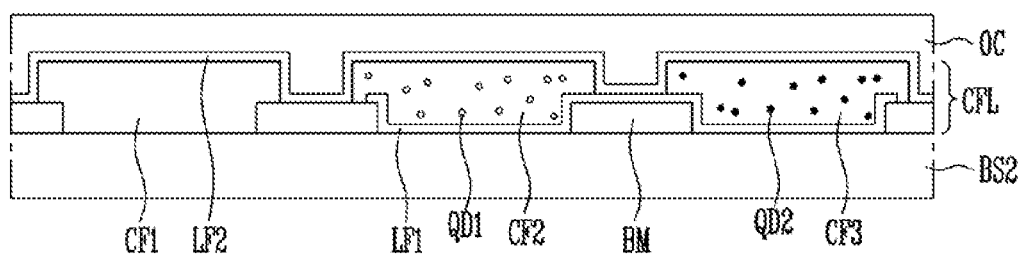

Referring to FIG. 8F, an overcoat layer OC is formed on a second light filter layer LF2.

Figure 8G:
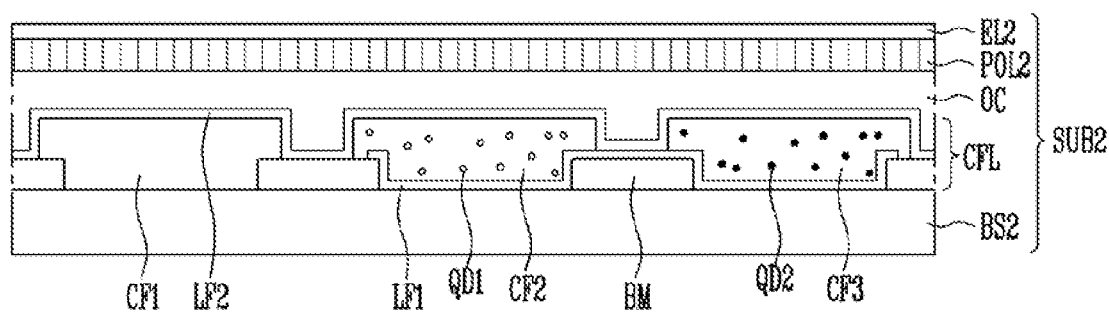

Referring to FIG. 8G, a second polarization layer POL2 and a second electrode EL2 are sequentially formed on the second substrate SUB2 on which the overcoat layer OC is formed.

Thereafter, although not shown, the second substrate SUB2 having the second electrode EL2 is combined to the first substrate SUB1 with the liquid crystal layer disposed therebetween, and then the first polarization layer POL1 may be formed on a back surface of the first base substrate BS1.

The display device according to an exemplary embodiment of the present inventive concept described above includes the overcoat layer made of the epoxy polymer, thereby reducing defects due to unevenness of the overcoat layer. This is because volumetric shrinkage during the curing process is remarkably reduced unlike overcoat layer made of an acryl-based polymer in the art.

An acryl-based polymer was used as a material of the overcoat layer in the art.

Since this acryl-based polymer had volumetric shrinkage of about 10% to 15% during the curing process, a step of the overcoat layer occurred at a level of 100 nm according to a lower topography.

The epoxy-based polymer has very low volumetric shrinkage of 2% to 3% during the curing process, so that a maximum step of the overcoat layer can be 30 nm or less. In addition, an amount of gas (i.e., outgas) discharged during the curing process was very small, and was reduced by about 85% compared with an acryl-based polymer.

Chemical Formula 4 is a general formula representing a polymerization reaction of a conventional acryl-based polymer, and Chemical Formula 5 is a general formula representing a ring opening reaction of an epoxy compound. In Chemical Formula, R or n is used for convenience of description, wherein R is a general functional group, and n is a number of repetitions in the case where a reaction on the left side occurs plural times.

[Chemical Formula 4]

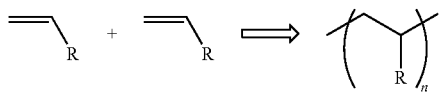

-continued

[Chemical Formula 5]

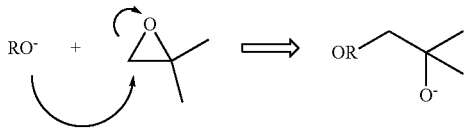

Referring to Chemical Formula 4, in the case of conventional acryl-based material, when the curing reaction occurs, covalent bonds are formed between two molecules which are polymerized to each other, thereby reducing the volume of a final compound compared with an initial composition. A distance between adjacent acryl-based monomers corresponds to a van der Waals bond and the adjacent acryl-based monomers are spaced apart by a distance of about 3 Å to 5 Å. However, when the acryl-based monomers covalently bonded, the distance between the two monomers bonded is very short to 1.4 Å. As a result, a volume of a final compound after curing process is significantly reduced, which causes a flatness of the overcoat layer to deteriorate.

Referring to Chemical Formula 5, in the case of an epoxy-based material of the present inventive concept, although the curing reaction occurs, the distance between the two monomers bonded by opening an epoxy ring is not relatively reduced. As a result, curing shrinkage does not occur even during curing process, thereby preventing the flatness from deteriorating.

Figure 9:
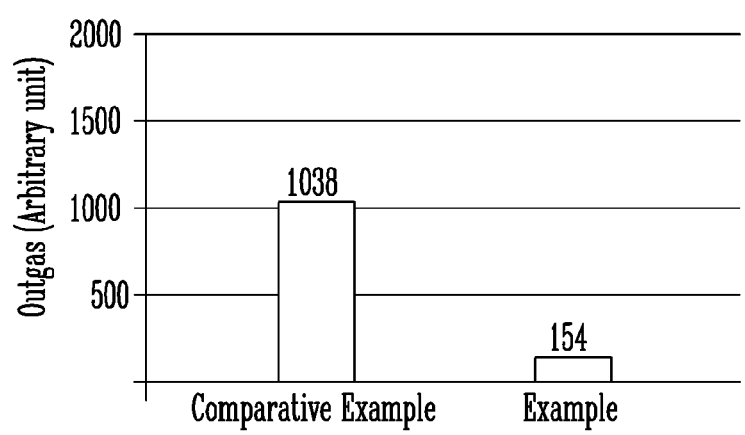
FIG. 9 is a graph comparing shrinkage in Comparative Example in which an overcoat layer is formed of an acryl-based polymer and in Example in which the overcoat layer is formed of an epoxy-based polymer.

FIG. 9 is a graph showing a total amount of outgas (for example, methanol, propenal, acetic anhydride, or the like) as a comparative value in Comparative Example in which an overcoat layer is formed of an acryl-based polymer and in Example in which the overcoat layer is formed of an epoxy-based polymer.

In both Comparative Example and Example, conditions except for the material were the same, and the overcoat layer was formed to a thickness of 4 μm.

Referring to FIG. 9, in Comparative Example, outgas had a value of about 1038, but in Example, outgas had a value of about 154, which showed that outgas is reduced by about 85%. As a result, it can be confirmed that an amount of outgas is remarkably reduced in the embodiments using a cardo-based epoxy as compared with Comparative Example using the acryl-based polymer. This means that the shrinkage of the overcoat layer in the embodiments using the cardo-based epoxy is remarkably reduced. Indeed, in the case of Comparative Example using the conventional acryl-based polymer, the shrinkage after final curing reaches about 10% to about 15% of a pre-shrinkage volume, but in the case of Example using cardo-based epoxy, the shrinkage after final curing is only about 1% to about 3% of the pre-shrinkage volume. Examples using the cardo-based epoxy can be confirmed in the following Experimental Example.

EXPERIMENTAL EXAMPLE

Table 1 shows a step size, shrinkage rate, and outgassing degree based on a composition ratio of the overcoat layer according to an exemplary embodiment of the present inventive concept. Herein, a step means a difference between a maximum height and a minimum height of the overcoat layer. The shrinkage means a volume difference before and after curing

TABLE 1

| | epoxy material (parts by weight) | | | | | | | |
|---|---|---|---|---|---|---|---|---|
| Number | Cardo-based binder resin | epoxy-based monomer | bisphenol-based resin | Etc. | Curing agent | Step (nm) | Shrinkage (%) | outgas |
| 1 | 20 | 0 | 50 | 30 | 60-120 | 150 | <2% | Normal |
| 2 | 30 | 0 | 40 | 30 | 60-120 | 150 | <2% | Normal |
| 3 | 30 | 10 | 30 | 30 | 60-120 | 100 | <2% | Normal |
| 4 | 30 | 15 | 25 | 30 | 60-120 | 50 | <2% | Almost none |
| 5 | 30 | 20 | 20 | 30 | 60-120 | 30 or less | <2% | Almost none |
| 6 | 30 | 25 | 15 | 30 | 60-120 | 50 | 2.5% | Normal |
| 7 | 30 | 30 | 10 | 30 | 60-120 | 100 | 3% | Plenty |
| 8 | 40 | 20 | 10 | 30 | 60-120 | 100 | <2% | Almost none |

As shown in Table 1, the shrinkage was 3% or less in all Examples using the epoxy-based polymer. Particularly, Examples 4 to 6 showed the step of 50 nm or less, the shrinkage of 2.5% or less, and the outgas of a small amount.

A display device and other exemplary embodiments having the structure described above may be used in various applications. For example, the display device and other exemplary embodiments may be used in a mobile device, a smart phone, an electronic book, a laptop computer, a notebook computer, a tablet computer, a personal computer, a billboard, and the like, but is not limited thereto.

While the present inventive concept has been shown and described with reference to certain exemplary embodiments thereof, it will be understood by those skilled in the art that various changes in forms and details may be made therein without departing from the spirit and scope of the present inventive concept as defined by the appended claims and their equivalents.

Accordingly, the technical scope of the present disclosure may be determined by on the technical scope of the accompanying claims.

What is claimed is:

1. A display device comprising:
   a first base substrate;
   a second base substrate;
   an overcoat layer disposed between the first base substrate and the second base substrate and including epoxy polymer; and
   a color conversion layer disposed between the overcoat layer and the second base substrate,
   wherein the epoxy polymer is a polymer obtained by polymerizing 20 parts to 40 parts by weight of a cardo-based binder resin, 15 parts to 25 parts by weight of an epoxy-based monomer, and 15 parts to 25 parts by weight of a bisphenol-based resin, with respect to 100 parts by weight of the epoxy polymer, wherein the cardo-based binder resin includes compounds represented by Chemical Formula 1:

[Chemical Formula 1]

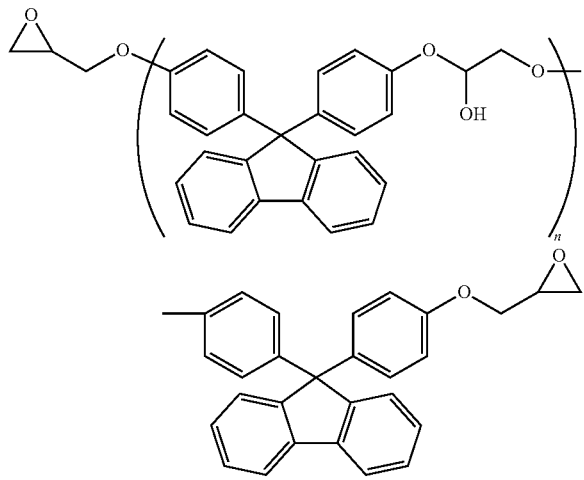

wherein, n is a natural number in which the cardo-based binder resin has a molecular weight of 5,000 to 20,000, and the epoxy-based monomer includes at least one of compounds represented by Chemical Formula 2:

[Chemical Formula 2]

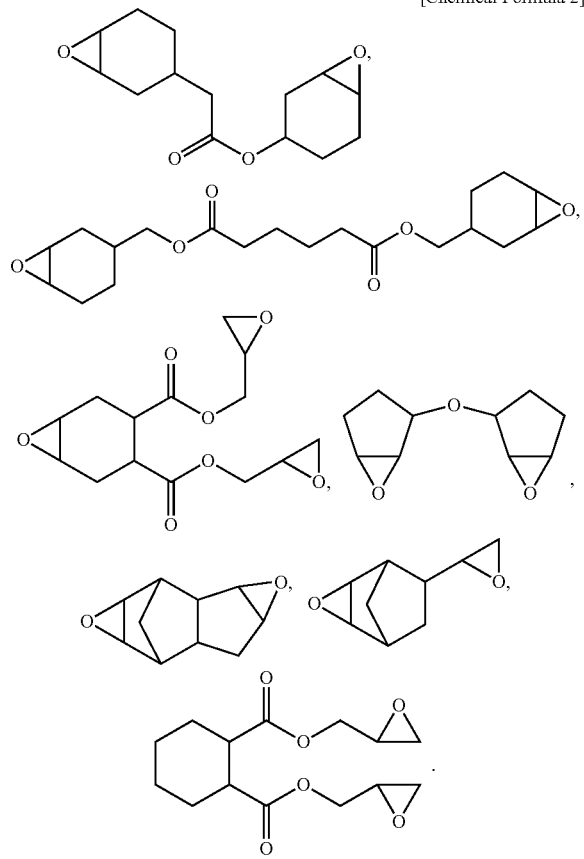

2. The display device of claim 1, wherein the bisphenol-based resin is a bisphenol A-based resin.

3. The display device of claim 2, wherein the epoxy polymer further includes 20 parts to 30 parts by weight of at least one of a bisphenol F based resin, a novolac resin, and an aliphatic epoxy resin, with respect to 100 parts by weight of the epoxy polymer.

4. The display device of claim 1, wherein the overcoat layer further includes 60 parts to 120 parts by weight of a curing agent, with respect to 100 parts by weight of the epoxy polymer.

5. The display device of claim 1, wherein the color conversion layer includes first to third color filters representing different colors from each other.

6. The display device of claim 5, wherein the second color filter includes a first light conversion material converting a first light into a second light which represents a different color from the first light, and the third color filter includes a second light conversion material converting the first light into a third light which represents a different color from the first light and the second light.

7. The display device of claim 6, wherein each of the first light conversion material and the second light conversion material is a quantum dot.

8. The display device of claim 6, wherein the first to third lights are respectively blue light, green light, and red light.

9. The display device of claim 5, further comprising a first light filter layer disposed between the second base substrate and the second color filter and between the second base substrate and the third color filter so as to block a first light.

10. The display device of claim 9, further comprising a second light filter layer disposed between the color conversion layer and the overcoat layer so as to transmit the first light and reflect a second light and a third light.

11. The display device of claim 1, further comprising a liquid crystal layer between the first base substrate and the overcoat layer.

12. The display device of claim 11, further comprising a polarization layer disposed between the liquid crystal layer and the overcoat layer.

13. The display device of claim 12, wherein the polarization layer is a wire grid polarizer.

14. The display device of claim 11, further comprising a light source spaced apart from the first base substrate and providing first light to the liquid crystal layer.

15. A method for manufacturing a display device comprising:
    forming a first electrode on a first base substrate;
    forming a color conversion layer on a second base substrate;
    forming an overcoat layer on the color conversion layer;
    forming a second electrode on the overcoat layer; and
    disposing the first base substrate and the second base substrate so that the first electrode and the second electrode are disposed between the first base substrate and the second base substrate,
    wherein the forming the overcoat layer includes:
    forming an epoxy composition including 20 parts to 40 parts by weight of a cardo-based binder resin, 15 parts to 25 parts by weight of an epoxy-based monomer, and 15 parts to 25 parts by weight of a bisphenol-based resin, with respect to 100 parts by weight of the epoxy composition, on the color conversion layer; and
    curing the epoxy composition to form an epoxy polymer,
    wherein the cardo-based binder resin includes compounds represented by Chemical Formula 1:

[Chemical Formula 1]

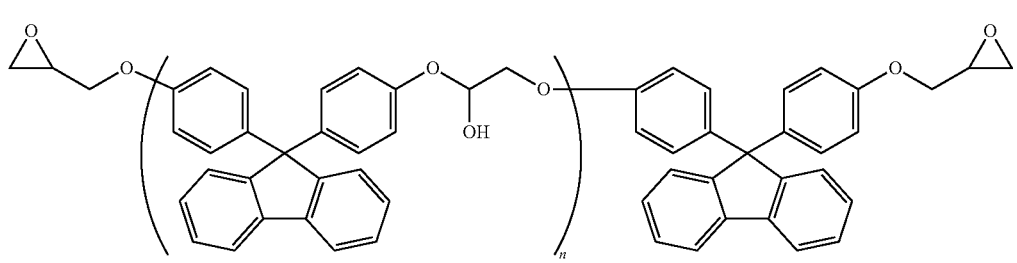

wherein, n is a natural number in which the cardo-based binder resin has a molecular weight of 5,000 to 20,000, and
the epoxy-based monomer includes at least one of compounds represented by Chemical Formula 2:

[Chemical Formula 2]

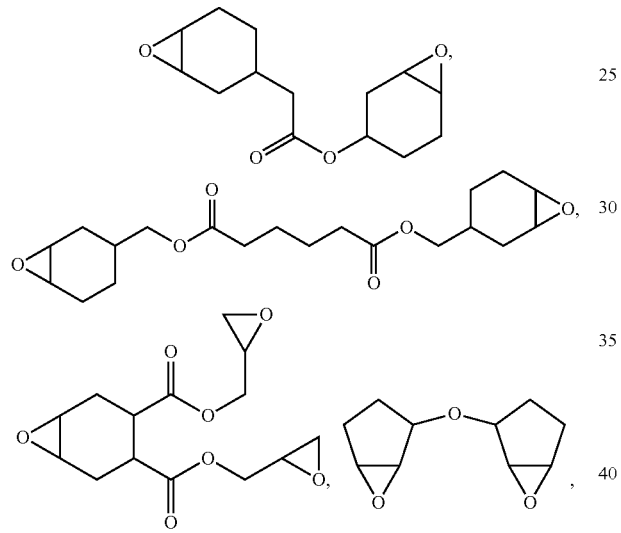

-continued

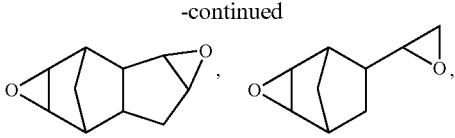

16. The method for manufacturing the display device of claim 15, further comprising forming a polarization layer between the overcoat layer and the second electrode.

17. The method for manufacturing the display device of claim 15, further comprising forming a liquid crystal layer on the first electrode,
wherein the disposing the first base substrate and the second base substrate includes:
disposing the liquid crystal layer between the first electrode and the second electrode.

* * * * *